US010436132B2

(12) United States Patent
Yamada et al.

(10) Patent No.: US 10,436,132 B2
(45) Date of Patent: Oct. 8, 2019

(54) ENGINE SYSTEM

(71) Applicant: TOYOTA JIDOSHA KABUSHIKI KAISHA, Toyota-shi, Aichi-ken (JP)

(72) Inventors: Eiji Yamada, Hekinan (JP); Keisuke Nagakura, Anjo (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 48 days.

(21) Appl. No.: 15/830,362

(22) Filed: Dec. 4, 2017

(65) Prior Publication Data

US 2018/0216547 A1 Aug. 2, 2018

(30) Foreign Application Priority Data

Jan. 27, 2017 (JP) .................................. 2017-012760

(51) Int. Cl.
*F02M 26/49* (2016.01)
*F02D 41/14* (2006.01)
(Continued)

(52) U.S. Cl.
CPC ......... *F02D 41/005* (2013.01); *F02D 41/009* (2013.01); *F02D 41/0085* (2013.01);
(Continued)

(58) Field of Classification Search
CPC .. F02D 41/005; F02D 41/009; F02D 41/0077; F02D 41/0097; F02M 26/20; F02M 26/49; F02M 26/50
See application file for complete search history.

(56) References Cited

U.S. PATENT DOCUMENTS 6,453,734 B1 * 9/2002 Tomikawa ............... F02D 21/08
73/114.04
6,842,690 B2 * 1/2005 Akao .................. F02D 41/0065
123/568.12

(Continued)

FOREIGN PATENT DOCUMENTS

JP H11-311151 11/1999
JP H11-326136 11/1999
(Continued)

*Primary Examiner* — Lindsay M Low
*Assistant Examiner* — George C Jin
(74) *Attorney, Agent, or Firm* — Finnegan, Henderson, Farabow, Garrett & Dunner, LLP

(57) ABSTRACT

An engine system includes: an engine including a plurality of cylinders; an EGR passage including EGR branch passages each configured to recirculate part of exhaust gas into an intake port of a corresponding one of the plurality of cylinders; an EGR valve configured to be capable of adjusting an EGR flow rate; and an ECU configured to control the EGR valve. When an engine rotation fluctuation amount in an EGR OFF state is less than a first determination value, and when the engine rotation fluctuation amount in an EGR ON state is greater than a second determination value, the ECU imposes an EGR restriction for restricting the EGR flow rate. When it is determined that the engine rotation fluctuation amount in the EGR ON state is greater than a third determination value less than the second determination value after the EGR restriction is imposed, the ECU continues the EGR restriction.

2 Claims, 3 Drawing Sheets

(51) Int. Cl.
*F02D 41/00* (2006.01)
*F02M 26/20* (2016.01)
(52) U.S. Cl.
CPC ......... *F02D 41/1498* (2013.01); *F02M 26/20* (2016.02); *F02M 26/49* (2016.02); *F02D 41/0077* (2013.01)

(56) References Cited

U.S. PATENT DOCUMENTS

| | | | |
|---|---|---|---|
| 2006/0144374 A1* | 7/2006 | Nishimura | F02D 41/0052 123/568.16 |
| 2007/0062499 A1* | 3/2007 | Miyasako | F02B 77/082 123/568.16 |
| 2012/0111000 A1 | 5/2012 | Harima | |
| 2013/0160750 A1* | 6/2013 | Maruyama | F02B 47/08 123/568.21 |
| 2019/0107064 A1* | 4/2019 | Yoshioka | F02D 41/0077 |

FOREIGN PATENT DOCUMENTS

| | | |
|---|---|---|
| JP | 2012-237253 | 12/2012 |
| JP | 2013-2299 | 1/2013 |
| JP | 2015-117642 | 6/2015 |
| WO | WO 2011/036740 | 3/2011 |

* cited by examiner

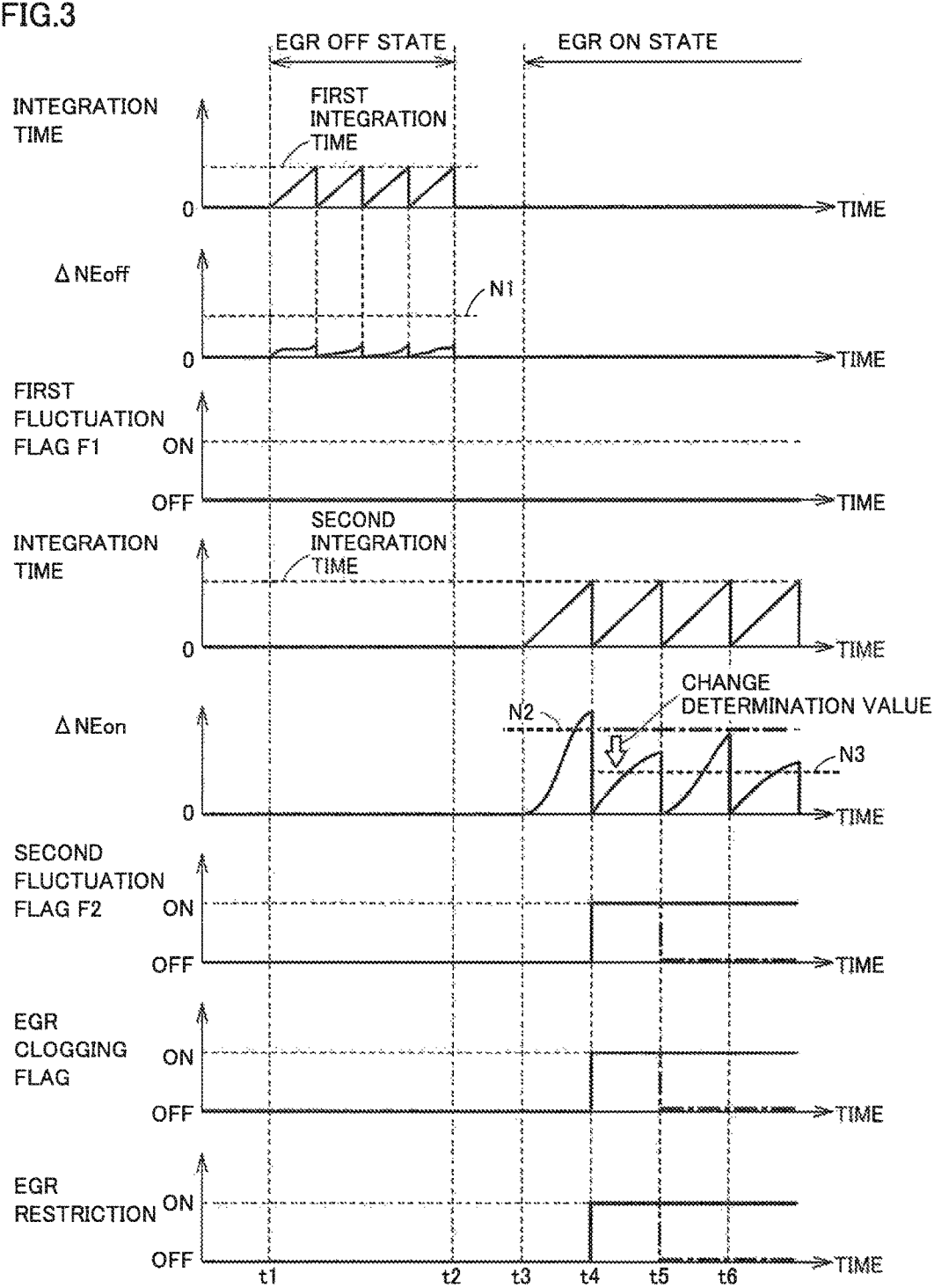

US 10,436,132 B2

ENGINE SYSTEM

This nonprovisional application is based on Japanese Patent Application No. 2017-012760 filed on Jan. 27, 2017 with the Japan Patent Office, the entire contents of which are hereby incorporated by reference.

BACKGROUND

Field

The present disclosure relates to an engine system including an exhaust gas recirculation (EGR) passage.

Description of the Background Art

Conventionally, there is an engine system including: an engine provided with a plurality of cylinders; and a plurality of EGR branch passages each configured to recirculate part of exhaust gas into a corresponding one of intake ports of the plurality of cylinders. In such an engine system, when there occurs a phenomenon in which a part of the plurality of EGR branch passages is clogged by sediments (deposits) and the like (which will be hereinafter also referred to as "EGR clogging"), a portion of the EGR gas that is to flow into the cylinder connected to the clogged EGR branch passage (which will be hereinafter also referred to as a "clogged cylinder") is caused to flow into a cylinder connected to the EGR branch passage that is not clogged (which will be hereinafter also referred to as a "non-clogging cylinder"). Accordingly, the EGR gas excessively flows into the non-clogging cylinder, so that the combustion in the non-clogging cylinder becomes unstable, which may lead to deteriorations in fuel efficiency, exhaust gas emission, and the like.

In view of the above, Japanese Patent Laying-Open No. 2012-237253 discloses a controller configured to determine whether EGR clogging occurs or not. Based on the engine rotation fluctuation amount in the EGR OFF state in which the EGR flow rate is less than a prescribed value and the engine rotation fluctuation amount in the EGR ON state in which the EGR flow rate is greater than the prescribed value, this controller determines whether EGR clogging occurs or not.

SUMMARY

When the above-described EGR clogging occurs, the EGR gas is unevenly distributed into the plurality of cylinders in the EGR ON state to thereby cause fluctuations of the engine rotation, whereas such fluctuations of the engine rotation do not occur in the EGR OFF state. The following is conceivable by utilizing the above-described feature. Specifically, when the engine rotation fluctuation amount in the EGR OFF state is less than the first determination value, and when the engine rotation fluctuation amount in the EGR ON state is greater than the second determination value, it is determined that EGR clogging occurs, and thus, the EGR flow rate is restricted. The EGR flow rate is restricted (which will be hereinafter also simply referred to as "EGR restriction"), thereby suppressing an excessive inflow of the EGR gas into a non-clogging cylinder. Consequently, deteriorations in fuel efficiency and exhaust gas emission caused by EGR clogging are suppressed.

Furthermore, the following is also conceivable. Specifically, when the engine rotation fluctuation amount in the EGR ON state is less than the second determination value after the EGR restriction is imposed, it is assumed that the EGR clogging is eliminated, and then, the EGR restriction is cancelled.

However, after the EGR restriction is imposed, combustion in the non-clogging cylinder is readily stabilized by this EGR restriction. Accordingly, engine rotation is more readily stabilized than before the EGR restriction is imposed. Therefore, if the determination value to be compared with the engine rotation fluctuation amount in the EGR ON state after the EGR restriction is set at the "second determination value" that is the same as the value used before the EGR restriction, the EGR restriction is cancelled even though EGR clogging is not eliminated. This leads to a concern that deteriorations in fuel efficiency and exhaust gas emission caused by EGR clogging may occur again.

The present disclosure has been made to solve the above-described problems. An object of the present disclosure is to, in an engine in which an EGR flow rate is restricted in the EGR clogged state, readily suppress that the restriction imposed on the EGR flow rate is cancelled even though EGR clogging is not eliminated after the EGR flow rate is restricted.

An engine system according to the present disclosure includes: an engine including a plurality of cylinders; an EGR passage including a plurality of EGR branch passages each configured to recirculate part of exhaust gas of the engine into an intake port of a corresponding one of the plurality of cylinders; an EGR valve configured to adjust an EGR flow rate through the EGR passage; and a controller configured to control the EGR valve. When it is determined that a first rotation fluctuation amount of the engine in an EGR OFF state is less than a first determination value, and when it is determined that a second rotation fluctuation amount of the engine in an EGR ON state is greater than a second determination value, the controller restricts the EGR flow rate in the EGR ON state. In the EGR OFF state, the EGR flow rate is less than a prescribed value, and in the EGR ON state, the EGR flow rate is greater than the prescribed value. When it is determined that the second rotation fluctuation amount is greater than a third determination value less than the second determination value after the EGR flow rate is restricted, the controller continuously restricts the EGR flow rate.

In the above-described configuration, when it is determined that the first rotation fluctuation amount of the engine in the EGR OFF state is less than the first determination value, and when it is determined that the second rotation fluctuation amount of the engine in the EGR ON state is greater than the second determination value, there is a possibility that EGR clogging may occur. Thus, the EGR flow rate is restricted. Then, after the EGR restriction is imposed, the determination value to be compared with the second rotation fluctuation amount is set at the "third determination value" that is less than the "second determination value" to be compared with the second rotation fluctuation amount before the EGR flow rate is restricted. Accordingly, even if the second rotation fluctuation amount decreases due to the EGR restriction to a value less than the second determination value after the EGR restriction is imposed, the EGR restriction can be continued unless the second rotation fluctuation amount decreases to a value less than the third determination value. Consequently, it becomes possible to readily suppress that the EGR restriction is canceled even though EGR clogging is not eliminated after the EGR restriction is imposed.

In an embodiment, when it is determined that the second rotation fluctuation amount is less than the third determination value after the EGR flow rate is restricted, the controller cancels the restriction imposed on the EGR flow rate.

In the above-described configuration, when the second rotation fluctuation amount decreases to a value less than the third determination value after the EGR restriction is imposed, the EGR restriction is canceled. Thereby, it becomes possible to suppress that the effect of improving the fuel efficiency by EGR is deteriorated by the EGR restriction that is continuously imposed even though EGR clogging is eliminated.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram showing an example of the manner of changes in various parameters calculated by the ECU.

DESCRIPTION OF THE PREFERRED EMBODIMENTS

Figure 1:
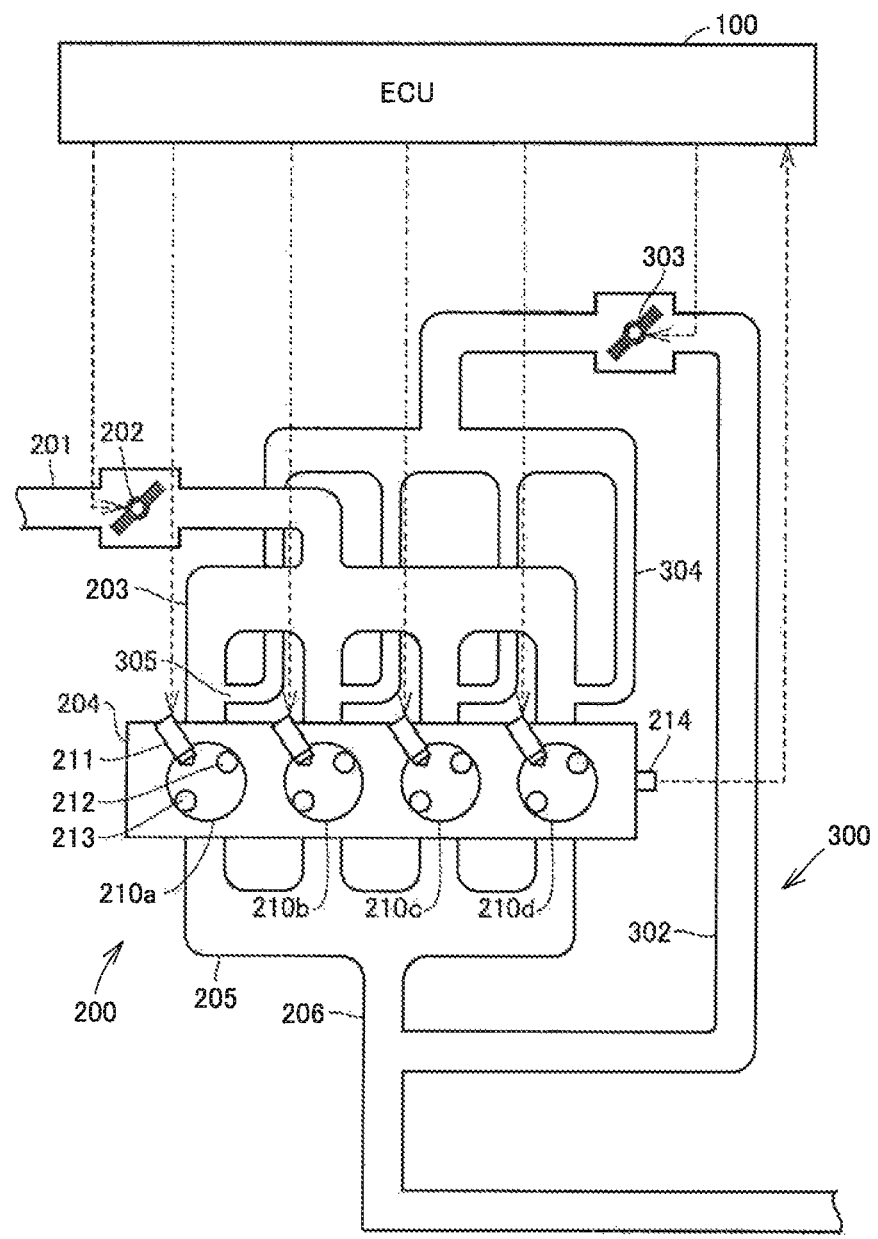
FIG. 1 is a diagram schematically showing an example of the configuration of an engine system.

Embodiments of the present disclosure will be hereinafter described in detail with reference to the accompanying drawings, in which the same or corresponding components are designated by the same reference characters, and description thereof will not be repeated.

FIG. 1 is a diagram schematically showing an example of the configuration of an engine system 10 according to the present embodiment. This engine system 10 is mounted in a vehicle (not shown).

Engine system 10 includes an electronic control unit (ECU) 100, an engine 200, and an exhaust gas recirculation (EGR) apparatus 300.

Engine 200 includes an intake passage 201, a throttle valve 202, an intake manifold 203, a cylinder block 204, an exhaust manifold 205, an exhaust passage 206, and a plurality of cylinders 210 (four cylinders 210a to 210d in the example shown in FIG. 1) that are arranged in parallel.

Air (intake air) suctioned from the outside the vehicle is suctioned into intake passage 201. Throttle valve 202 is provided inside intake passage 201, and configured to be capable of adjusting the flow rate of the intake air. Throttle valve 202 is controlled by a control signal from ECU 100.

Intake manifold 203 is in communication with intake passage 201 on the upstream side of the intake air. Furthermore, intake manifold 203 branches into a plurality of intake branch passages on the downstream side of the intake air. Each of the plurality of intake branch passages is in communication with a corresponding one of the plurality of cylinders 210.

Each of the plurality of cylinders 210 includes: a combustion chamber; an injector 211 configured to inject a liquid fuel into the combustion chamber; an intake valve 212 provided at a portion where the intake port and the combustion chamber are in communication with each other; and an exhaust valve 213 provided at a portion where the combustion chamber and the exhaust port are in communication with each other.

Injector 211 is controlled by a control signal from ECU 100. The fuel-air mixture made of the fuel injected from injector 211 into the combustion chamber and the intake gas suctioned through intake passage 201 into the combustion chamber is compressed inside each of the cylinders in the compression stroke, and then ignited and burned in the combustion stroke. The force produced in the combustion stroke causes the piston inside each cylinder 210 to reciprocate, which is then converted into a rotational movement of a crankshaft (not shown).

FIG. 1 shows an example in which injector 211 is a cylinder injection-type injector, but injector 211 may be a port injection-type injector. Furthermore, a cylinder injection-type injector and a port injection-type injector both may be provided in each of cylinders 210.

The exhaust gas obtained after combustion in each cylinder 210 is exhausted through an exhaust port to exhaust manifold 205.

On the upstream side of the exhaust gas (that is, on the cylinder 210 side), exhaust manifold 205 branches into a plurality of exhaust branch passages, each of which is in communication with a corresponding one of the plurality of cylinders 210. The plurality of exhaust branch passages join exhaust passage 206 on the downstream side of the exhaust gas.

EGR apparatus 300 is configured such that part of the exhaust gas to be exhausted into exhaust passage 206 can be recirculated as EGR gas into each cylinder 210. EGR apparatus 300 includes an EGR passage 302 and an EGR valve 303.

EGR passage 302 is formed as a tubular member, through which exhaust gas flows. EGR passage 302 has one end connected to exhaust passage 206. EGR passage 302 branches into a plurality of EGR branch passages 304 on the downstream side of EGR valve 303. Each of the plurality of EGR branch passages 304 is in communication at an opening 305 with a corresponding one of the plurality of intake branch passages. Accordingly, part of the exhaust gas in engine 200 is recirculated through each of the plurality of EGR branch passages 304 into each of the intake ports of the plurality of cylinders 210.

EGR valve 303 is provided at a portion inside EGR passage 302 so as to be located on the upstream side of EGR branch passages 304. EGR valve 303 is configured to be capable of adjusting the flow rate of the EGR gas (which will be hereinafter also referred to as an "EGR flow rate") that flows through EGR passage 302. When EGR valve 303 is in an opened state, part of the exhaust gas extracted from exhaust passage 206 is distributed as EGR gas into each of the plurality of EGR branch passages 304, and then, supplied into each of the intake ports of the plurality of cylinders 210.

In the following description, there are expressions of: an "EGR OFF state" that is defined as the state where EGR valve 303 is in the closed state or in the almost closed state, and the state where the EGR flow rate is less than a prescribed value (the state where the EGR gas is hardly recirculated); and an "EGR ON state" that is defined as the state where EGR valve 303 is in the opened state, and the state where the EGR flow rate is greater than the prescribed value (the state where the EGR gas is recirculated).

Engine 200 is provided with a crank angle sensor 214. Crank angle sensor 214 detects the rotation angle of the crankshaft in engine 200, and outputs the detection result to ECU 100.

ECU 100 incorporates a central processing unit (CPU) and a memory that are not shown, and performs a prescribed computing process based on the information stored in the memory and the information from each sensor. Based on the result of the computing process, ECU 100 controls the operations of engine 200, EGR valve 303, and the like.

Based on the detection result from crank angle sensor 214, ECU 100 detects (calculates) a rotation speed of engine 200 (which will be hereinafter referred to as an "engine speed") NE.

<EGR Clogging Determination and EGR Restriction>

As described above, four EGR branch passages 304 are connected to engine 200. Each of four EGR branch passages 304 is configured to recirculate part of exhaust gas into a corresponding one of the intake ports of four cylinders 210.

In such an engine 200, there may occur a phenomenon in which any (one to three) of four EGR branch passages 304 is/are clogged by deposits and the like (which will be hereinafter also referred to as "EGR clogging"). When EGR clogging occurs, a portion of the EGR gas that is to flow into the cylinder connected to the clogged EGR branch passage 304 (which will be hereinafter also referred to as a "clogged cylinder") is caused to flow into the cylinder connected to the EGR branch passage that is not clogged (which will be hereinafter also referred to as a "non-clogging cylinder"). Accordingly, the EGR gas excessively flows into the non-clogging cylinder, so that the combustion in the non-clogging cylinder becomes unstable, which may lead to deteriorations in fuel efficiency, exhaust gas emission and the like in the entire engine 200.

In consideration of the above, ECU 100 according to the present embodiment performs a process of determining whether EGR clogging occurs or not (which will be hereinafter also referred to as "EGR clogging determination") by using (i) the value obtained by integrating the fluctuation amount (absolute value) of engine speed NE in the EGR OFF state by the first integration time (which will be hereinafter also referred to as an "EGR OFF rotation fluctuation amount ΔNEoff"), and (ii) the value obtained by integrating the fluctuation amount (absolute value) of engine speed NE in the EGR ON state by the second integration time (which will be hereinafter also referred to as an "EGR ON rotation fluctuation amount ΔNEon"). Each of the first integration time and the second integration time described above may be a fixed value or may be a fluctuation value (for example, the time period until the accumulated number of ignition times reaches a prescribed number of times). Furthermore, the first integration time and the second integration time may be the same value, or may be different values.

When EGR clogging occurs, EGR gas is unevenly distributed into four cylinders 210 in the EGR ON state to thereby cause fluctuations of engine speed NE, whereas such fluctuations do not occur in the EGR OFF state. By utilizing the above-described feature, ECU 100 determines that EGR clogging occurs, upon satisfaction of the conditions that EGR OFF rotation fluctuation amount ΔNEoff is less than a first determination value N1, and that EGR ON rotation fluctuation amount ΔNEon is greater than a second determination value N2 (which will be hereinafter also referred to as "clogging conditions").

Then, when it is determined that EGR clogging occurs, ECU 100 performs the process of, while maintaining the EGR ON state, restricting the EGR flow rate more than the case where it is not determined that EGR clogging occurs (which will be hereinafter also referred to as "EGR restriction"). EGR restriction allows suppression of an excessive inflow of the EGR gas into a non-clogging cylinder in the EGR ON state. Thus, deteriorations in fuel efficiency and exhaust gas emission caused by EGR clogging in the EGR ON state are suppressed.

<Reflective Process after EGR Restriction is Imposed>

When the EGR clogging conditions becomes unsatisfied after the EGR restriction is imposed, it is desirable to cancel the EGR restriction assuming that EGR clogging is eliminated. Accordingly, ECU 100 performs an EGR clogging determination also after an EGR restriction is imposed. Then, when it is no longer determined that EGR clogging occurs (that is, when the above-described clogging conditions becomes unsatisfied), ECU 100 performs the process of cancelling the EGR restriction (which will be hereinafter also referred to as a "reflective process after EGR restriction is imposed").

However, after an EGR restriction is imposed, the combustion in the non-clogging cylinder is readily stabilized by this EGR restriction. Thus, the rotation of engine 200 is more readily stabilized than before the EGR restriction is imposed. Accordingly, after the EGR restriction is imposed, when the determination value to be compared with EGR ON rotation fluctuation amount ΔNEon is set at "second determination value N2" that is the same as the value before the EGR restriction is imposed, it is not determined that EGR clogging occurs even though EGR clogging is not actually eliminated, with the result that the EGR restriction is canceled. This causes a concern that deteriorations in fuel efficiency and exhaust gas emission caused by EGR clogging may occur again.

In consideration of the above, when ECU 100 according to the present embodiment performs the reflective process after the EGR restriction is imposed, this ECU 100 sets the determination value to be compared with EGR ON rotation fluctuation amount ΔNEon at a "third determination value N3" that is less than "second determination value N2". Thus, even if EGR ON rotation fluctuation amount ΔNEon decreases due to the EGR restriction to a value less than second determination value N2 after this EGR restriction is imposed, the EGR restriction can be continued unless EGR ON rotation fluctuation amount ΔNEon decreases to a value less than third determination value N3. Consequently, it becomes possible to readily suppress that the EGR restriction is canceled even though EGR clogging is not eliminated after the EGR restriction is imposed.

<Control Flow>

Figure 2:
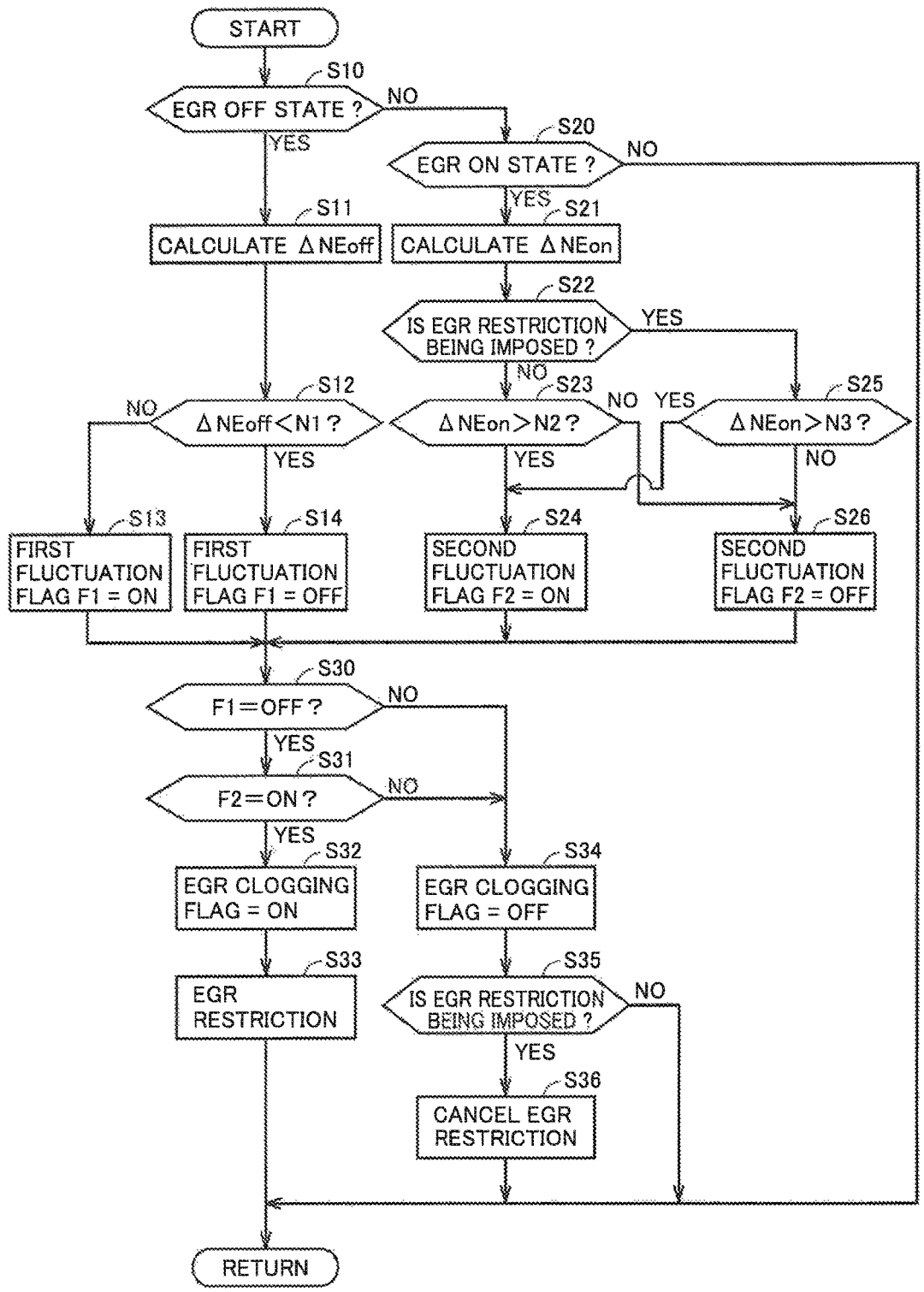
FIG. 2 is a flowchart illustrating an example of the processing procedure of an ECU.

FIG. 2 is a flowchart illustrating an example of the processing procedure executed when ECU 100 performs the reflective process after the EGR clogging determination, the EGR restriction and the EGR restriction as described above. This flowchart is repeatedly performed in a prescribed cycle during the operation of ECU 100.

In step (which will be hereinafter abbreviated as "S") 10, ECU 100 determines whether the EGR OFF state occurs or not. For example, ECU 100 estimates an EGR flow rate from the operation state of engine 200 (engine speed NE, the amount of intake air suctioned into the engine, and the like) and the opening degree of EGR valve 303. Then, when the estimated EGR flow rate is less than a prescribed EGR OFF determination value, ECU 100 determines that the EGR OFF state occurs.

When it is determines that the EGR OFF state occurs (YES in S10), ECU 100 calculates the above-described EGR OFF rotation fluctuation amount ΔNEoff (S11). Specifically, ECU 100 calculates a value, as EGR OFF rotation fluctuation amount ΔNEoff, obtained by integrating the fluctuation amount of engine speed NE by the first integration time. It is to be noted that calculation of EGR OFF rotation fluctuation amount ΔNEoff is repeatedly performed each time the first integration time elapses. In other words, EGR OFF rotation fluctuation amount ΔNEoff is reset to an initial value 0 each time the first integration time elapses.

Then, ECU 100 determines whether EGR OFF rotation fluctuation amount ΔNEoff is less than first determination value N1 or not (S12). When it is determined that EGR OFF rotation fluctuation amount ΔNEoff is less than first determination value N1 (YES in S12), ECU 100 sets a first fluctuation flag F1 to be "OFF" (S14). On the other hand, if it is not determined that EGR OFF rotation fluctuation amount ΔNEoff is less than first determination value N1 (NO in S12), ECU 100 sets first fluctuation flag F1 to be "ON" (S13). First fluctuation flag F1 serves to indicate whether or not there is a history of having been determined that the fluctuation of engine speed NE in the EGR OFF state is small. First fluctuation flag F1 is stored in a memory inside ECU 100.

If it is not determined that the EGR OFF state occurs (NO in S10), ECU 100 determines whether the EGR ON state occurs or not (S20). For example, ECU 100 estimates an EGR flow rate from the operation state of engine 200 (engine speed NE, the amount of intake air suctioned into the engine, and the like) and the opening degree of EGR valve 303. When the estimated EGR flow rate is greater than a prescribed EGR ON determination value, ECU 100 determines that the EGR ON state occurs.

If it is not determined that the EGR ON state occurs (NO in S20), ECU 100 skips the subsequent processes and advances the process to Return.

If it is determined that the EGR ON state occurs (YES in S20), ECU 100 calculates the above-described EGR ON rotation fluctuation amount ΔNEon (S21). Specifically, ECU 100 calculates a value, as EGR ON rotation fluctuation amount ΔNEon, obtained by integrating the fluctuation amount of engine speed NE by the second integration time. This calculation of EGR ON rotation fluctuation amount ΔNEon is repeatedly performed each time the second integration time elapses. In other words, EGR ON rotation fluctuation amount ΔNEon is reset to an initial value 0 each time the second integration time elapses.

Then, ECU 100 determines whether an EGR restriction is being imposed (the process in S33 described below is being performed) or not (S22).

If an EGR restriction is not being imposed (NO in S22), ECU 100 determines whether EGR ON rotation fluctuation amount ΔNEon is greater than second determination value N2 or not (S23). If it is determined that EGR ON rotation fluctuation amount ΔNEon is greater than second determination value N2 (YES in S23), ECU 100 sets second fluctuation flag F2 to be "ON" (S24). On the other hand, if it is not determined that EGR ON rotation fluctuation amount ΔNEon is greater than second determination value N2 (NO in S23), ECU 100 sets second fluctuation flag F2 to be "OFF" (S26). In addition, second fluctuation flag F2 serves to indicate whether or not there is a history of having been determined that the fluctuation of engine speed NE in the EGR ON state is large. This second fluctuation flag F2 is stored in a memory inside ECU 100.

On the other hand, if an EGR restriction is being imposed (YES in S22), ECU 100 determines whether EGR ON rotation fluctuation amount ΔNEon is greater than a third determination value N3 or not (S25). In this case, "third determination value N3" is set at a value less than "second determination value N2" to be compared with EGR ON rotation fluctuation amount ΔNEon in S23. Then, if it is determined that EGR ON rotation fluctuation amount ΔNEon is greater than third determination value N3 (YES in S25), ECU 100 sets second fluctuation flag F2 to be "ON" (S24). On the other hand, if it is not determined that EGR ON rotation fluctuation amount ΔNEon is greater than third determination value N3 (NO in S25), ECU 100 sets second fluctuation flag F2 to be "OFF" (S26).

After any of the processes in S13, S14, S24, and S26 is performed, ECU 100 determines whether first fluctuation flag F1 is "OFF" or not (S30). Furthermore, ECU 100 determines whether second fluctuation flag F2 is "ON" or not (S31).

If first fluctuation flag F1 is "OFF" (YES in S30) and if second fluctuation flag F2 is "ON" (YES in S31), that is, if the above-described clogging conditions are satisfied, ECU 100 determines that EGR clogging occurs, and sets the EGR clogging flag to be "ON" (S32). The EGR clogging flag serves to indicate whether EGR clogging occurs or not. This EGR clogging flag is stored in a memory inside ECU 100. Then, ECU 100 imposes an EGR restriction (S33).

If first fluctuation flag F1 is not "OFF" (NO in S30), or if second fluctuation flag F2 is not "ON" (NO in S31), that is, if the above-described clogging conditions are not satisfied, ECU 100 determines that EGR clogging does not occur, and sets the EGR clogging flag to be "OFF" (S34). Then, ECU 100 determines whether an EGR restriction is being imposed or not (S35). If an EGR restriction is being imposed (YES in S35), ECU 100 cancels the EGR restriction (S36). In addition, if the EGR restriction is not being imposed (NO in S35), ECU 100 skips the process in S36 and advances the process to Return.

FIG. 3 is a diagram showing an example of the manner of changes in various parameters calculated by ECU 100. In FIG. 3, the horizontal axis indicates time, and the vertical axis indicates, sequentially from the top, the integration time of the fluctuation amount of engine speed NE in the EGR OFF state (first integration time), EGR OFF rotation fluctuation amount ΔNEoff first fluctuation flag F1, the integration time of the fluctuation amount of engine speed NE in the EGR ON state (second integration time), EGR ON rotation fluctuation amount ΔNEon, second fluctuation flag F2, the EGR clogging flag, and the EGR restriction.

FIG. 3 shows an example in which each of the first integration time and the second integration time is set at a fixed value, and the first integration time is shorter than the second integration time. FIG. 3 also shows an example in which the EGR OFF state occurs in the time period from time t1 to time t2, and the EGR ON state occurs in the time period at and after time t3.

In the time period during which the EGR OFF state occurs (the time period from time t1 to time t2), EGR OFF rotation fluctuation amount ΔNEoff is calculated each time the first integration time elapses. In the time period during which the EGR OFF state occurs, EGR OFF rotation fluctuation amount ΔNEoff is less than first determination value N1. Thus, it is determined that the fluctuation of engine speed NE in the EGR OFF state is small. Then, first fluctuation flag F1 is set to be "OFF".

Then, in the time period during which the EGR ON state occurs (the time period at and after time t3), EGR ON rotation fluctuation amount ΔNEon is calculated each time the second integration time elapses.

In this case, an EGR restriction is not imposed in the time period from time t3 to time t4. Accordingly, the determination value to be compared with EGR ON rotation fluctuation amount ΔNEon is set at "second determination value N2". Also, EGR ON rotation fluctuation amount ΔNEon is greater than second determination value N2 at time t4. Thus, it is determined that the fluctuation of engine speed NE in the EGR ON state is large. Then, second fluctuation flag F2 is set to be "ON".

Thereby, first fluctuation flag F1 is set to be "OFF" and second fluctuation flag F2 is set to be "ON" at time t4, so that the clogging conditions are satisfied. Accordingly, it is determined that EGR clogging occurs. Then, the EGR clogging flag is set to be "ON", and an EGR restriction is started.

At and after time t4 at which the EGR restriction is started, combustion in the non-clogging cylinder is readily stabilized by the EGR restriction, so that EGR ON rotation fluctuation amount ΔNEon decreases to a value less than second determination value N2. Accordingly, if the determination value to be compared with EGR ON rotation fluctuation amount ΔNEon after the EGR restriction is imposed is set at "second determination value N2" that is the same as the value before the EGR restriction is imposed, even though EGR clogging is not actually eliminated, second fluctuation flag F2 is set to be OFF. Thereby, it is determined that EGR clogging is eliminated. Thus, the EGR restriction is to be cancelled (see an alternate long and short dash line).

However, in the present embodiment, at and after time t4 at which the EGR restriction is started, the determination value to be compared with EGR ON rotation fluctuation amount ΔNEon decreases from "second determination value N2" to "third determination value N3" that is less than second determination value N2. Then, at and after time t4 at which the EGR restriction is started, EGR ON rotation fluctuation amount ΔNEon decreases to a value less than second determination value N2, but is still greater than third determination value N3. Accordingly, second fluctuation flag F2 is maintained to be ON, and the EGR restriction is continued. Thereby, it is suppressed that the EGR restriction is canceled even though EGR clogging is not actually eliminated.

As described above, when EGR OFF rotation fluctuation amount ΔNEoff is less than first determination value N1, and when EGR ON rotation fluctuation amount ΔNEon is greater than second determination value N2, ECU 100 according to the present embodiment determines that EGR clogging occurs, and imposes an EGR restriction.

Then, when performing the reflective process after an EGR restriction is imposed, ECU 100 sets the determination value to be compared with EGR ON rotation fluctuation amount ΔNEon at "third determination value N3" that is less than second determination value N2. Thus, even if EGR ON rotation fluctuation amount ΔNEon decreases due to the EGR restriction to a value less than second determination value N2 after the EGR restriction is imposed, the EGR restriction can be continued unless EGR ON rotation fluctuation amount ΔNEon decreases to a value less than third determination value N3. Consequently, it becomes possible to readily suppress that the EGR restriction is canceled even though EGR clogging is not eliminated after the EGR restriction is imposed.

Furthermore, when EGR ON rotation fluctuation amount ΔNEon decreases to a value less than third determination value N3 after the EGR restriction is imposed, the EGR restriction is canceled. Thereby, it becomes possible to suppress that the effect of improving the fuel efficiency by EGR is deteriorated by the EGR restriction that is continuously imposed even though EGR clogging is eliminated.

Although the embodiments of the present invention have been described as above, it should be understood that the embodiments disclosed herein are illustrative and non-restrictive in every respect. The scope of the present invention is defined by the terms of the claims, and is intended to include any modifications within the meaning and scope equivalent to the terms of the claims.

What is claimed is:

1. An engine system comprising:
   an engine including a plurality of cylinders;
   an EGR passage including a plurality of EGR branch passages each configured to recirculate part of exhaust gas of the engine into an intake port of a corresponding one of the plurality of cylinders;
   an EGR valve configured to adjust an EGR flow rate through the EGR passage; and
   a controller configured to control the EGR valve,
   when it is determined that a first rotation fluctuation amount of the engine in an EGR OFF state is less than a first determination value, and when it is determined that a second rotation fluctuation amount of the engine in an EGR ON state is greater than a second determination value, the controller restricts the EGR flow rate in the EGR ON state,
   the EGR OFF state being a state where the EGR flow rate is less than a prescribed value, and
   the EGR ON state being a state where the EGR flow rate is greater than the prescribed value, and
   when it is determined that the second rotation fluctuation amount is greater than a third determination value less than the second determination value after the EGR flow rate is restricted, the controller continuously restricts the EGR flow rate.

2. The engine system according to claim 1, wherein when it is determined that the second rotation fluctuation amount is less than the third determination value after the EGR flow rate is restricted, the controller cancels a restriction imposed on the EGR flow rate.

* * * * *